(12) United States Patent
McLoughlin et al.

(10) Patent No.: US 7,536,756 B2
(45) Date of Patent: May 26, 2009

(54) HOSE BRIDLE SYSTEM

(76) Inventors: John E. McLoughlin, 3 Country La., Lake Grove, NY (US) 11755; Neocles G. Athanasiades, 6 Mayeeck Dr., Setauket, NY (US) 11723; Toh M. Meng, 15 Sunflower Dr., Hauppauge, NY (US) 11788

( * ) Notice: Subject to any disclaimer, the term of this patent is extended or adjusted under 35 U.S.C. 154(b) by 56 days.

(21) Appl. No.: 11/239,527

(22) Filed: Sep. 30, 2005

(65) Prior Publication Data

US 2007/0074379 A1   Apr. 5, 2007

(51) Int. Cl.
*A45F 3/14* (2006.01)
(52) U.S. Cl. ............ 24/298; 24/302; 224/572; 248/75; 294/149
(58) Field of Classification Search ........ 24/298, 24/302, 16 R, 16 PB; 294/149, 150; 224/572; 248/61, 74.3, 75, 499, 500; 285/23, 114; 137/316

See application file for complete search history.

(56) References Cited

U.S. PATENT DOCUMENTS

| 790,874 | A | * | 5/1905 | Donovan et al. | 24/299 |
| 1,592,556 | A | * | 7/1926 | Canaan, Jr. | 248/78 |
| 2,884,173 | A | * | 4/1959 | Campbell et al. | 224/617 |
| 4,549,332 | A | * | 10/1985 | Pouliot | 24/335 |
| 4,638,764 | A | * | 1/1987 | Anderson | 119/770 |
| 4,805,862 | A | * | 2/1989 | Wissman | 248/229.1 |
| 5,110,023 | A | * | 5/1992 | Colin | 224/620 |
| 5,806,467 | A | * | 9/1998 | Arakawa | 119/771 |
| 6,345,418 | B1 | * | 2/2002 | Bertrand et al. | 24/16 R |

* cited by examiner

*Primary Examiner*—James R Brittain
(74) *Attorney, Agent, or Firm*—Haynes and Boone, LLP

(57) ABSTRACT

A bridle system for a hose has apparatus for connecting the system to a hose, a loop for securing the apparatus and associated hose to a fire truck for example and a loop for assisting in unloading the hose from the truck.

20 Claims, 4 Drawing Sheets

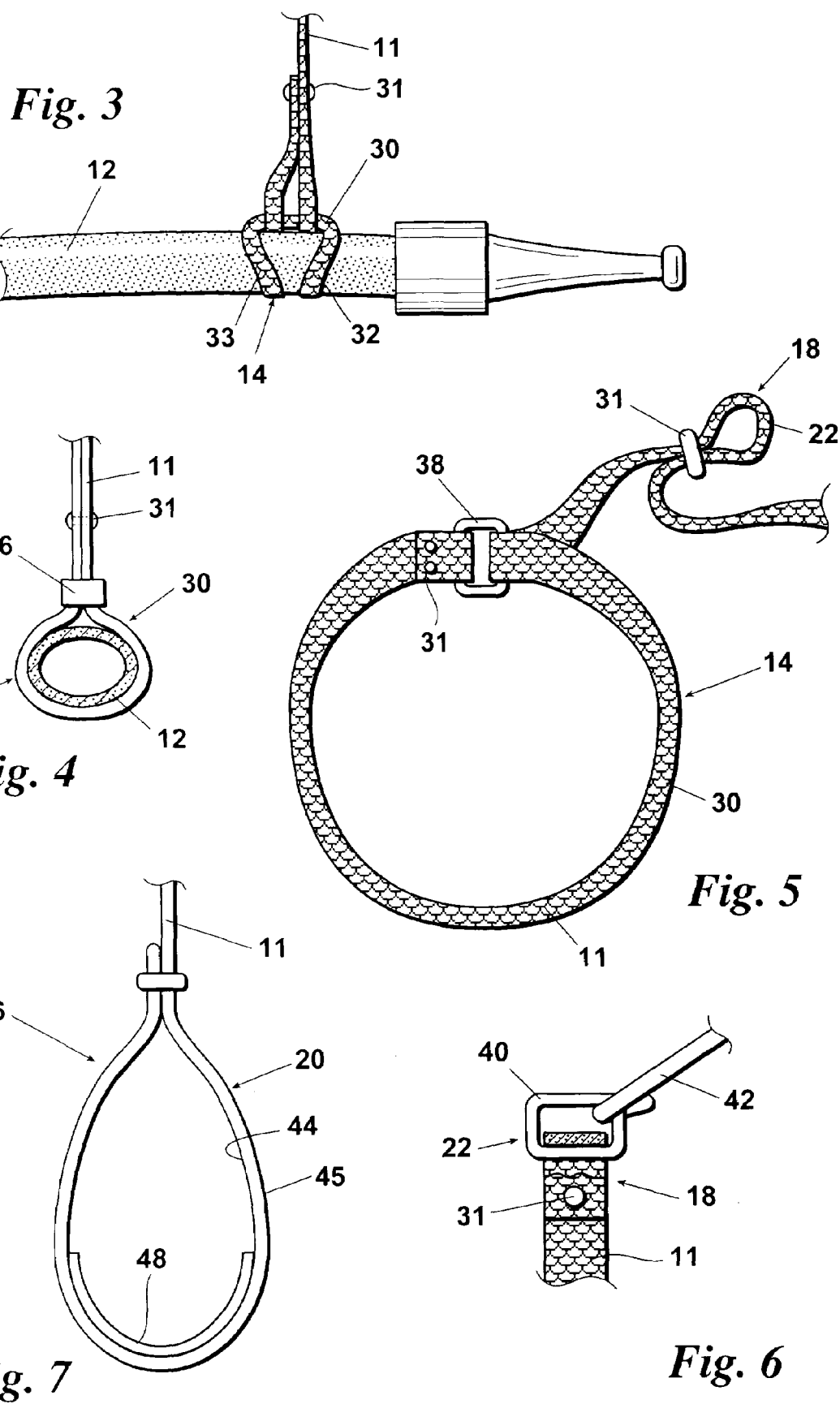

HOSE BRIDLE SYSTEM

CROSS REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

The subject invention relates to a bridle system for a hose. More particularly, the subject invention relates to a bridle system for securing a hose to and releasing it from a vehicle and for securing the hose to a hydrant while unloading the hose from a vehicle or securing the hose to a person while unloading the hose and using the hose.

2. Description of Related Art Including Information Disclosed Under 37 CFR 1.97 and 1.98

Hose, for example fire hose, are often carried on a truck in an unsecured manner. It is therefore possible for the hose to jiggle off of the truck during high speed runs to the scene of a fire, for example. The nozzle and hose can be damaged by falling from the truck. Also, individuals can be hit and injured by the falling nozzle and hose.

One reason that nozzle and hose are often carried in an unsecured manner is that the operators want to quickly remove the hose upon arrival at their destination. They do not want to spend time untying or fumbling with other time consuming restraining means.

The subject invention is therefore directed to apparatus that can be used for securing the hose to a vehicle and assist in removing the hose from the vehicle while providing easy and quick release of the hose from the vehicle.

The present invention is directed to overcome one or more of the problems as set forth above.

BRIEF SUMMARY OF THE INVENTION

A bridle system is provided for a hose. The bridle has a strap having first and second end portions and a middle portion. The first end portion is connectable to the hose at a location adjacent an end of the hose. The second end portion has a loop of a size sufficient for passing about a fire hydrant. The middle portion has a loop of a size smaller than said second end portion loop and is adapted for releasably securing the hose at a preselected location.

In another embodiment of the invention a bridle system is provided for a fire hose and tool. The bridle system, as set forth above, has a pocket connected to the bridle system. The pocket is of a size and construction sufficient for receiving and releasably maintaining a tool with the bridle system.

BRIEF DESCRIPTION OF THE SEVERAL VIEWS OF THE DRAWING(S)

FIG. 3 is a partial view of the first end portion of the bridle of this invention and another type connection to the hose;

FIG. 4 is a partial view of the first end portion of the bridle of this invention and yet another type connection to the hose;

FIG. 5 is a view of the first end portion of the bridle of this invention and a further type connection to the hose and a view of the middle portion of the bridle and its middle portion loop;

FIG. 6 is another view of the middle portion of the bridle and a different type middle portion loop;

FIG. 7 is a partial view of the second end portion of the bridle and the loop of said second end portion;

DETAILED DESCRIPTION OF THE INVENTION

Figure 1:
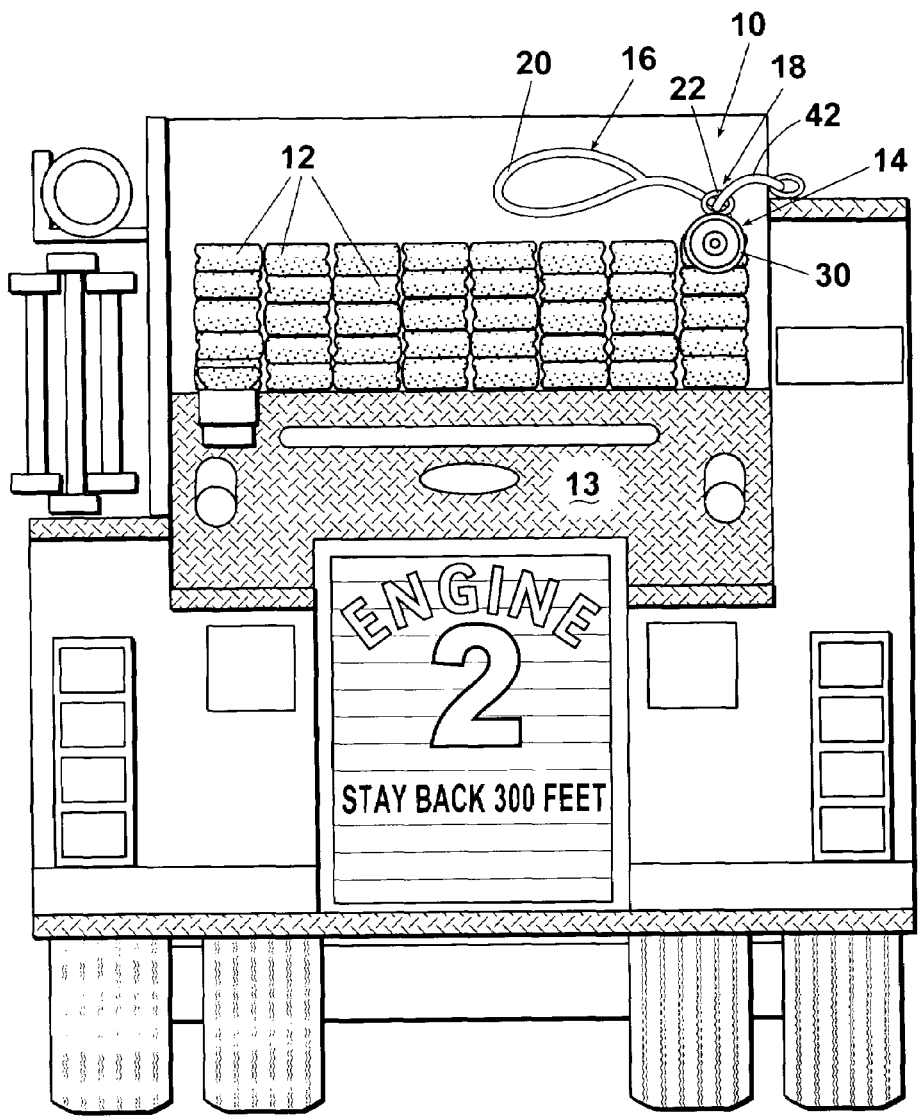
FIG. 1 is a partial rear view of a truck having folded hose and the apparatus of this invention.

Referring generally to FIGS. 1-5, a bridle system 10 is provided for a hose 12 on a fire truck 13, for example. The bridle system 10 has a strap 11 which has first and second end portions 14, 16 and a middle portion 18. The first end portion 14 is connectable to the hose 12 at a location adjacent one end of the hose. The second end portion 16 has a loop 20 of a size sufficient for passing about a fire hydrant ( not shown). The middle portion 18 has a loop 22 of a size smaller than the second end portion loop 20 and is adapted for releasably securing the hose 12 to a vehicle 13 with a hook 42 of a carabiner or other connecting device.

Figure 2:
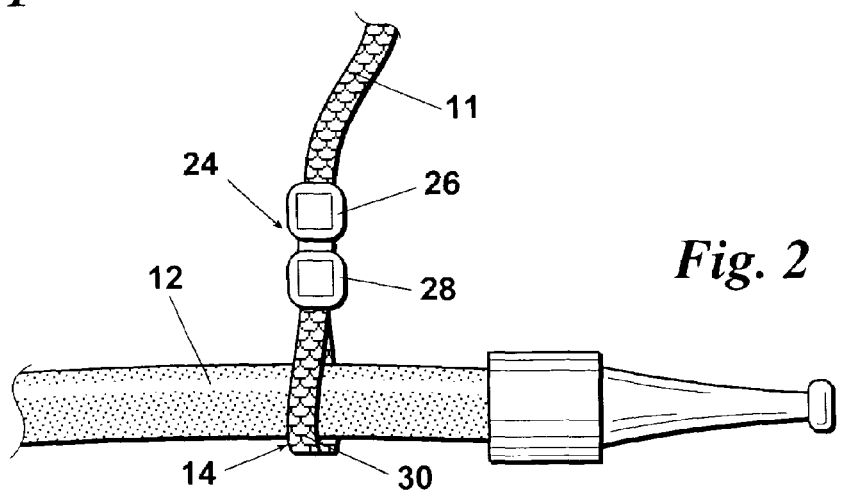
FIG. 2 is a partial view of the first end portion of the bridle of this invention and it's connection to the hose.

Referring to FIG. 2, the first end portion 14 of the bridle strap 11 show one embodiment for connecting the strap 11 to the hose 12. In this embodiment, the first end portion of the strap is a buckle 24 connectable to the hose 12. A first portion 26 of the buckle 24 is connected to the bridle strap 11 and a second portion 28 of the buckle 24 is connected to the hose 12. The first and second buckle portions 26,28 are mateable one with the other. The buckle 24 is preferably of the quick release type.

Referring to FIGS. 2-5, the first end portion 14 of the bridle strap 11 shows embodiments for connecting the bridle strap 11 to the hose 12 via an adjustable strap loop 30 that is of a size sufficient for passing about the hose 12.

Referring to FIG. 3, the end of the first end portion 14 of the strap 11 is doubled over and connected to the strap, by a rivet 31 for example, thereby forming a primary loop. The primary loop is doubled over upon and through itself forming an adjustable loop 30 having two strap portions 32,33 extending about the hose 12.

Referring to FIG. 4, the end of the first end portion 14 of the strap 11 is doubled over and connected to the strap, by a rivet 31 for example, thereby forming a loop 30. A metal keeper 36, such as a clamp for example, is placed over a portion of the loop 30 with other portions of the loop 30 in tight engagement with the hose 12.

Referring to FIG. 5, the end of the first end portion of the strap 11 is doubled over a modified ring 38 or buckle and connected to the strap, by a rivet 31 for example, and another portion of the first end portion of the strap 11 is passed through the ring thereby forming an adjustable loop 30 about the hose 12.

The middle portion 18 of the strap 11 has means for connecting the strap 11 with accompanying hose 12 to a vehicle 13, with a quick disconnect for example, to prevent the hose from falling from the vehicle. In the embodiment of FIG. 5, the connecting means is a middle portion loop 22 formed by doubling the middle strap portion and connecting one portion of the strap to another portion of the strap 11 by a rivet 31 for example.

Referring to FIG. 6, a middle portion loop 22 of different construction is shown. In this embodiment, the loop 22 is formed by a metal ring 40 which is connected to the middle portion of the strap by a rivet 31. As shown, the middle portion loop 22 is formed of a size sufficient for receiving a hook 42 of a carabiner or other connecting device for securing the hose 12 to the vehicle 13.

Referring to FIG. 7, the loop 20 of the second end portion 16 of the strap 11 has a circumference greater than about 36 inches, more preferably about 48 inches. Less than about 36 inches would not be desirable because the loop 20 would not fit over a fire hydrant during unloading of the hose 11 from a moving fire truck 13 and would be less comfortable when placed over a user's shoulder when unloading or using the hose 11.

In the preferred embodiment, the loop 20 has an inner and outer surface 44,45 with the inner surface 44 having a wear resistant material 48 connected thereto. The wear resistant material 48 can be one of organic plastic or metal for example. Preferably the material 48 will be organic plastic, such as polyethylene for example.

Figure 8:
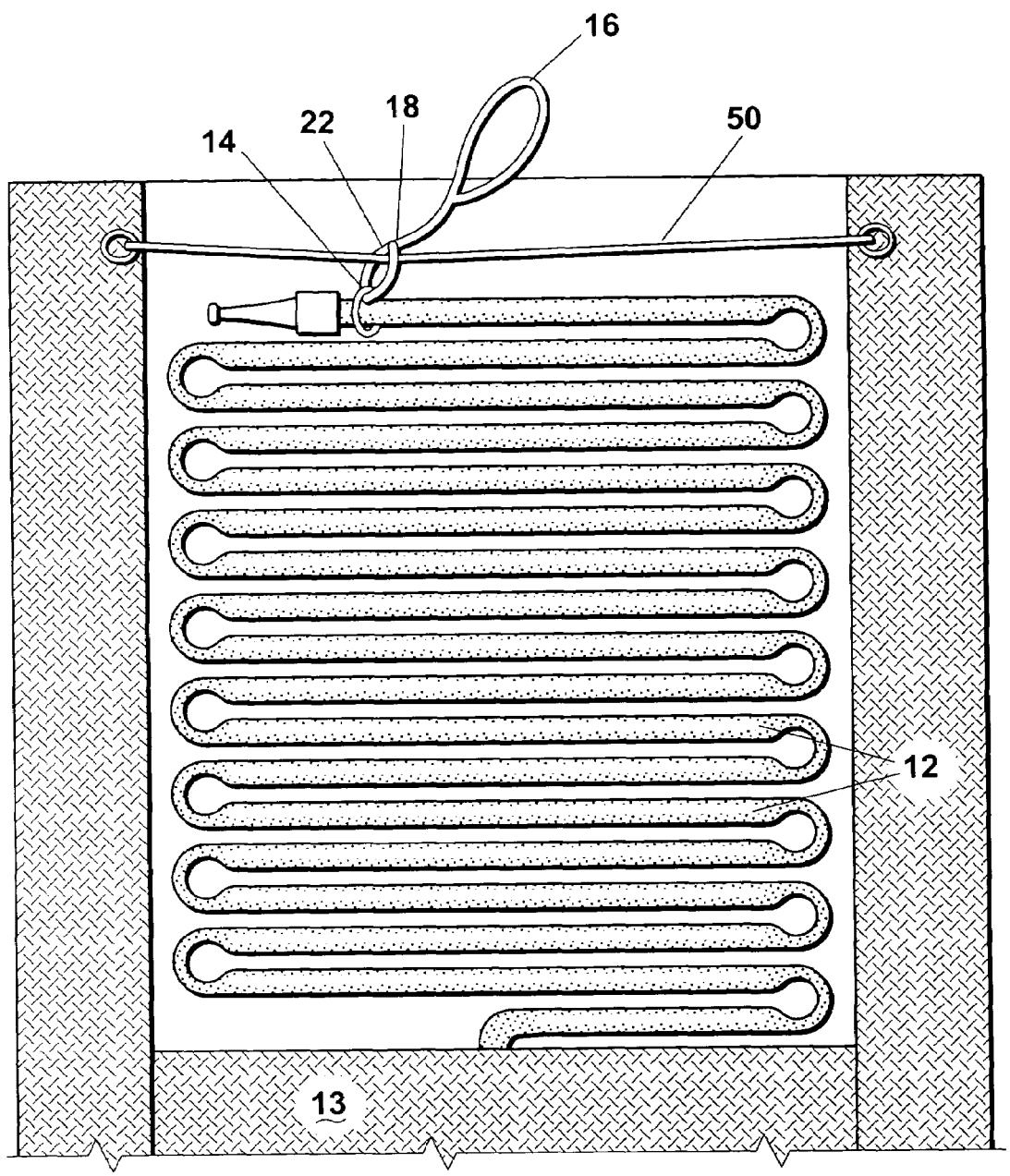
FIG. 8 is a partial top view of a vehicle having hose laying transverse the longitudinal axis of the vehicle and another type connection for securing the hose to the vehicle.

Referring to FIG. 8, the bridle system 10 and accompanying hose are secured to the fire truck 13 by a wire, cable, chain, or securing strap 50 passing through the middle portion loop 22 and being connectable on opposed side of the truck 13. In this embodiment the size of the loop 22 is sufficient for removing the wire or cable from the loop 22.

The embodiment of the apparatus of FIG. 8 is particularly beneficial when used with a truck 13 wherein the hose is positioned transversely the longitudinal axis of the truck and the hose is removed from the truck 13 on one side or the other. In this embodiment, either end of the cable or securing strap 50 can be release and the hose 12 end pulled to that same side and unloaded with the cable or securing strap 50 passing through and from the loop 22.

By this construction of FIG. 8, transverse loaded hose 12 can be released from and unloaded from either side of the vehicle 13 thereby saving time in sometimes having to run around the vehicle to release the hose from a specific side of the vehicle 13.

In the construction of FIG. 1, the bridle system 10 and associated hose 12 is connected to and maintained with the truck on the passenger side of the truck. Other connections for maintaining the hose with the truck can be utilized without departing from this invention.

In unloading or using the hose, the loop 20 can be placed over the shoulder of an individual and the hose removed by the individual pulling on the loop 20. In another type operation advantageously used, the loop 20 can be placed over a fire hydrant and the truck driven away for unloading the hose 11.

The strap 11 can be formed of any material which will withstand the rugged use to which it will be subjected. A preferred material would be a Nylon strap which has a width of about three inches.

Figure 9:
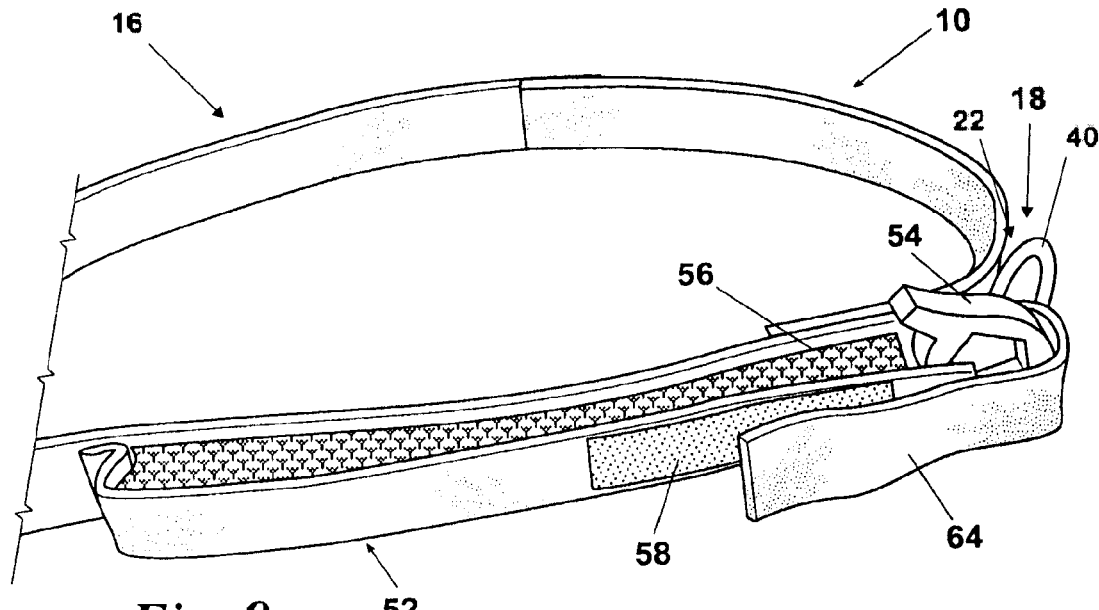
FIG. 9 is a perspective partial view of the second end portion of the bridle which has a tool pocket connected thereto.

Referring to FIG. 9, a bridle system is shown which has a pocket 52 connected to the bridle system 10. The pocket is of a size and construction sufficient for receiving and maintaining a tool 54, for example a hydrant wrench, with the bridle system 10.

Figure 10:
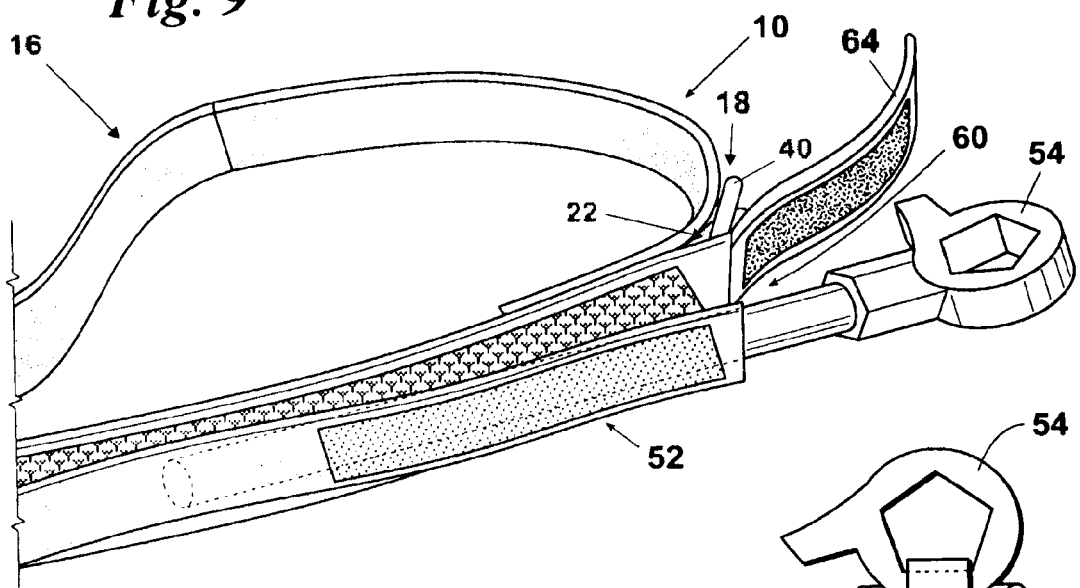
FIG. 10 is a perspective partial view of the second end portion of the bridle which has a tool pocket connected thereto with the pocket closure in the tool released position.

In the preferred embodiment shown in FIGS. 9 and 10, the pocket 52 is connected to the second end portion of the bridle system 10. In this embodiment, the pocket 52 has first and second opposed side walls 56, front panel 58 and an open end 60 for receiving a tool 54. A pocket closure strap 64 fixedly connected at one end to the second end portion and releasably connected at the other end to the front panel 58. As shown, the releasable connection of the strap 64 is of the hook and eye type, as is well known in the art.

Figure 11:
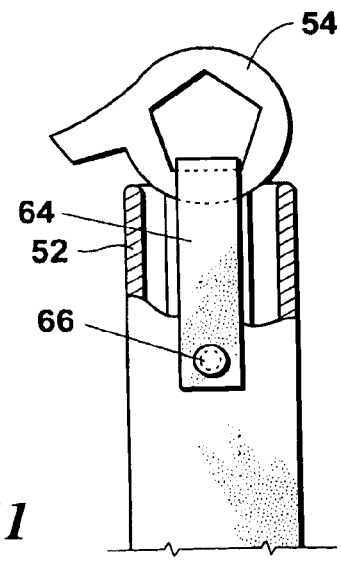
FIG. 11 is a partial sectional view of a pocket closure of different configuration.

FIG. 11 shows a portion of the pocket 52 and tool 54 wherein the releasable connection 66 is a snap fastener, as is well known in the art, and for this tool 54, the strap 64 is passed through an opening of the tool 54 for releasably maintaining the tool 54 in the pocket 52.

By the use of the apparatus of this invention, time and energy are saved in the unloading of fire hose. Such savings can often be of significant importance.

In addition to the benefits obtained from use of the bridle system of this invention, as set forth above, it has significant value when used adjacent the nozzle end of the hose. As is known in the art of fire fighting equipment, high pressure water exiting from the nozzle requires considerable muscle power to control. The nozzle is heavy and the forces of the exiting water causes the hose to whip around.

With one of the bridle systems of this invention connected adjacent the nozzle end of the hose, an operator can place the loop 20 of the second end portion of the bridle system over his shoulder and considerably reduce the muscle power required of his hands and arms in controlling the hose. Since the loop 20 is of significant size, an operator can easily detach himself from any connection to the hose by releasing his hands from the hose and shrugging the loop 20 off his shoulder. Therefore the bridle system of this invention is of significant value in reducing fatigue of operators in both unloading the hose and in subsequent use of the hose. Other aspects, objects, and advantages of this invention can be obtained from a study of the drawings, the disclosure, and the appended claims.

The invention claimed is:

1. A bridle system for a hose, comprising a strap having first and second end portions and a middle portion, said first end portion having a loop being connectable to the hose at a location adjacent an end of the hose, said second end portion having a loop of a size sufficient for passing about a fire hydrant, and said middle portion having a loop of a size smaller than said first end portion loop and being adapted for releasably securing the hose at a preselected location, wherein the loop of the middle portion includes a metal ring connected to the middle portion of the strap, and the second end portion loop has an inner and an outer surface, said inner surface of said second end portion loop having a wear resistant material connected thereto.

2. A bridle system, as set forth in claim 1, wherein the first end portion loop is an adjustable loop of a size sufficient for passing about the hose.

3. A bridle system, as set forth in claim 1, wherein the second end portion loop has a circumference greater than about 36 inches.

4. A bridle system, as set forth in claim 1, wherein the second end portion loop has a circumference of about 48 inches.

5. A bridle system, as set forth in claim 1, wherein the wear resistant material is metal.

6. A bridle system, as set forth in claim 1, wherein the wear resistant material is organic plastic.

7. A bridle system for a fire hose and tool, comprising: a strap having first and second end portions and a middle portion, said first end portion having a loop being connectable to the hose at a location adjacent an end of the hose, said second end portion having a loop of a size sufficient for passing about a fire hydrant, and said middle portion having a loop of a size smaller than said first end portion loop and being adapted for releasably securing the hose at a preselected location; and a pocket connected to the bridle system and being of a size and construction sufficient for receiving and releasably maintaining a tool with the bridle system.

8. A bridle system, as set forth in claim 7, wherein
said first end portion having an adjustable first end strap loop
said second end portion having an adjustable second end strap loop, and
said first and second end strap loops formed from a single, continuous piece of strap material.

9. A bridle system, as set forth in claim 8, wherein the end for the first end portion of the strap is connected to a metal keeper through which passes a portion of the first end portion of the strap thereby forming said adjustable first end strap loop.

10. A bridle system, as set forth in claim 8, wherein the end of the first end portion of the strap is doubled over and connected to the strap thereby forming a primary loop which can be doubled over upon and through itself forming said adjustable first end strap loop having two strap portions extending about the hose.

11. A bridle system, as set forth in claim 8, wherein the middle portion strap loop is of a size sufficient for receiving a hook.

12. A bridle system, as set forth in claim 8, wherein the middle portion strap loop is adapted to receive a wire, cable, or securing system passing therethrough and being connectable on opposed sides of a vehicle, said middle portion strap loop being of a size sufficient for removing the wire, cable, or securing system from said middle portion strap loop.

13. A bridle system, as set forth in claim 8, wherein the middle portion strap loop is formed by doubling the strap at the middle portion and connecting one portion of the strap to another portion of the strap.

14. A bridle system, as set forth in claim 8, wherein the strap is formed of Nylon.

15. A bridle system, as set forth in claim 8, wherein the strap has a width of about 3 inches.

16. A bridle system, as set forth in claim 8, wherein the pocket is connected to the second end portion of the bridle system.

17. A bridle system, as set forth in claim 8, wherein the pocket has first and second opposed side walls and an open end for receiving a tool and a strap fixedly connected at one end to the first pocket side wall and releasably connected at the other end to the second pocket side wall.

18. A bridle system for a fire hose for retaining an end of the fire hose in a ready position on a fire truck, carrying the end of the fire hose to a desired location, retaining the end of the fire hose at a desired location and controlling the end of the fire hose during usage, comprising:
a first end portion, the first end portion comprising:
a first loop, the first loop including a flexible elongated portion having a first end, a second end and a central portion therebetween, the first loop having a width, a length and a thickness, the thickness being defined by an inner and outer surface, the inner surface being operable to interface with the outer surface of a fire hose, the width being sufficient to prevent damage to the fire hose, the length being sufficient to encircle an outer circumference of the fire hose, the elongated portion first end having means to releasably attach itself to the elongated portion second end, the elongated portion first end having further means for adjusting the length available to encircle the fire hose;
a second end portion, the second end portion comprising:
a second loop, the second loop including a flexible elongated portion having a first end, a second end and a central portion therebetween, the second loop having a width, a length and a thickness, the thickness being defined by an inner and outer surface, the inner surface being operable to interface with a user's body or to interface with an outer surface of a fire hydrant, the width being sufficient to prevent injury to the user's body, the length being sufficient to loop around a user's shoulder or to encircle an outer circumference of the fire hydrant, the elongated portion first end having means to releasably attach itself to the elongated portion second end, the elongated portion first end having further means for adjusting the length available to encircle the user's body or to loop around the fire hydrant; and
a tool pocket, the tool pocket being attached to the outer surface of the second end portion and having a closable flap with closure means for releasably closing the closable flap
a middle portion, the middle portion comprising:
a third loop adapted for releasably securing the fire hose to the ready position on the fire truck, the third loop having a sufficient diameter to releasably receive a securing means associated with the ready position,
the middle portion being attached to a location on the first end portion, the second end portion, or therebetween.

19. The bridle system of claim 18, wherein the closable flap has a width that is sufficiently narrow to pass through an opening of a hydrant tool.

20. The bridle system of claim 18, wherein the second end portion is releasably coupled to the first portion.

* * * * *